F. GINSBURG.
DEMOUNTABLE RIM FOR VEHICLE WHEELS.
APPLICATION FILED DEC. 20, 1920.

1,434,113.

Patented Oct. 31, 1922.
2 SHEETS—SHEET 1.

INVENTOR.
F. Ginsburg
BY
ATTORNEYS.

F. GINSBURG.
DEMOUNTABLE RIM FOR VEHICLE WHEELS.
APPLICATION FILED DEC. 20, 1920.
1,434,113.
Patented Oct. 31, 1922.
2 SHEETS—SHEET 2.
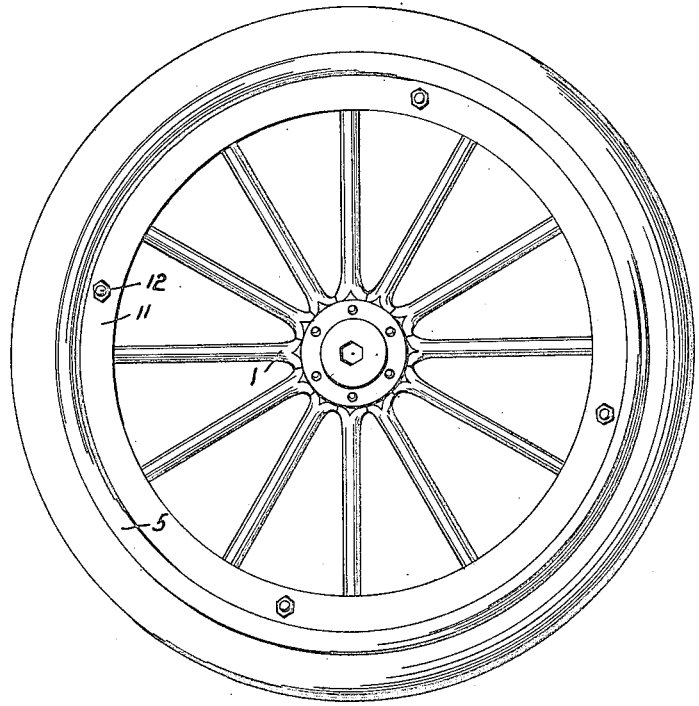
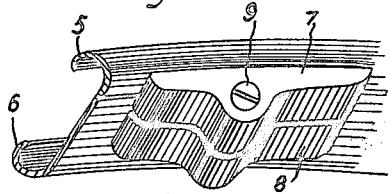
Fig. 3.
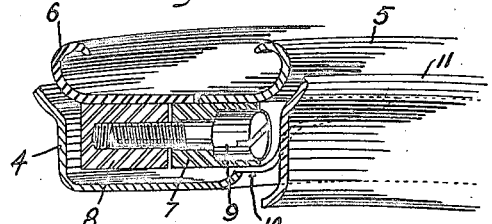
Fig. 4.
Fig. 5.
INVENTOR.
F. Ginsburg
BY
ATTORNEYS.

Patented Oct. 31, 1922.

1,434,113

UNITED STATES PATENT OFFICE.

FREDERICK GINSBURG, OF CHICAGO, ILLINOIS.

DEMOUNTABLE RIM FOR VEHICLE WHEELS.

Application filed December 20, 1920. Serial No. 431,902.

*To all whom it may concern:*

Be it known that I, FREDERICK GINSBURG, a citizen of the United States, residing at Chicago, county of Cook, State of Illinois, have invented a certain new and useful Improvement in Demountable Rims for Vehicle Wheels, and declare the following to be a full, clear, and exact description of the same, such as will enable others skilled in the art to which it pertains to make and use the same, reference being had to the accompanying drawings, which form a part of this specification.

My invention has for its object to produce a simple and novel demountable rim on which a pneumatic tire may be assembled and from which it may be removed quickly and easily.

A further object of the present invention is to produce a simple and novel demountable rim and means for securing it upon the rim of a wheel in such a manner that all of the parts may be assembled quickly and conveniently and without the use of any other tool than a simple automatic screw driver or the like.

A further object of the present invention is to produce a simple and novel wheel construction having a channel-shaped rim and a two-part demountable rim associated therewith and held together by means which will be housed within the channel of the wheel rim when the parts are assembled.

A further object of the present invention is to produce a simple and novel construction of wheel and demountable rim in which a channel-shaped wheel rim serves as a housing for fastening means between the parts of the demountable rim, while such means co-operate with one of the flanges of the wheel rim to lock the rim against circumferential movement relatively to the wheel.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Fig. 3 is a view similar to Fig. 1 with the clamping flange or ring in place thereon;

Fig. 4 is a perspective view of a fragment of the demountable rim; and

Fig. 5 is a view similar to Fig. 2, taken at a different point along the rim.

Figure 1:
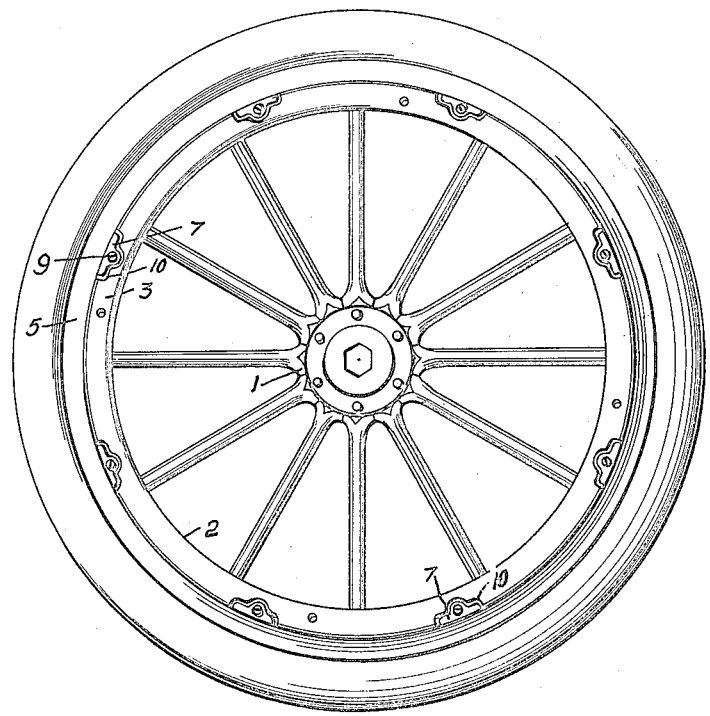
Figure 1 is a side elevation of a wheel arranged in accordance with my invention, the clamping flange or ring being omitted.

Referring to the drawings, 1 represents an ordinary wheel body having a channel-shaped rim, 2, the flanges of the channel being directed outwardly. The flange, 3, of the rim is shallower than the other flange, 4. The demountable rim is made of two sections, 5 and 6, meeting each other on a plane at right angles to the axis of the wheel. On the under side of the demountable rim sections are welded or otherwise secured heavy lugs, 7 and 8, respectively; there being a series of such lugs spaced at equal distances apart along the rim and each of the lugs on one rim section being adapted to register with the corresponding lug on the other rim section when the two parts of the rim are assembled. The two rim sections are held together by means of strong screws, 9, each of which passes through one of the lugs, 7, and into a screw threaded opening in the opposite lug, 8. The heads of the screws are countersunk so that they do not project beyond the vertical outer side faces of the lugs 7. The parts are preferably so proportioned that some of the lugs on one rim section project inwardly for some distance underneath the opposite rim section so that the joints between the lugs do not lie in the same plane as the joint between the two rim sections; thus giving a solid support for the extreme inner marginal portions of each rim section wherever a pair of lugs occurs. In the arrangement shown, the lugs 7 and 8 are made alike and, in order to secure the staggered joints to which reference has just been made, the rim section, 5, is made narrower than the other rim section, so that the latter extends inwardly beyond the lugs 8 and overlies the inner ends of the lugs 7.

The inner diameter of the demountable rim, omitting the lugs, is such that the demountable rim may be slipped laterally upon the stationary rim over the top of the shallower flange, 3. In order to permit the lugs on the demountable rim to pass the rim flange 3, the latter is provided with notches, 10, cut through the same and corresponding in number and spacing to the lugs on the demountable rim and in shape to the contour of these lugs as viewed from the side of the wheel. The combined width of each pair of lugs, 7 and 8, measured in the direction parallel with the axis of the wheel is preferably such that when the lugs 8 engage with the inner wall of the flange, 4, of the wheel rim, the outer ends of the lugs 7 rest within the notches, 10, and are flush with the outer wall of the flange 3. Thus the lugs are housed within the channel-shaped wheel rim and they are interlocked with one of the flanges of the latter so as to permit relative displacement of the two rims in the circumferential direction.

Figure 2:
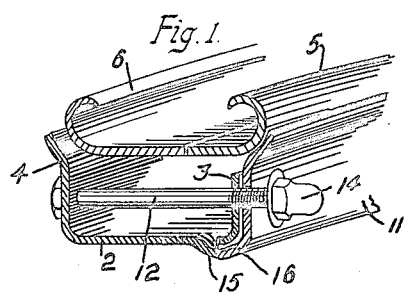
Fig. 2 is a view partly sectional and partly perspective, of the wheel rim and the demountable rim assembled thereon.

The demountable rim is held in place by means of a clamping or holding flange or ring, 11, which rests against the outer face or side of the flange 3 of the wheel rim and has an external diameter sufficient to permit it to extend upwardly and partially overlap the flange portion of the demountable rim section, 5. The member 11 is held in place by means of a few bolts, 12, passing through the flanges 3 and 4 of the wheel rim and through the member 11; there being nuts, 14, on the ends of the bolts which project through the holding or clamping flange or ring. In the arrangement shown, there are only four of the bolts, 12, although any other desired number may be employed. From the bottom of the rim 2 there may be struck lugs, 15, against which an inwardly-curved marginal portion, 16, of the clamping or holding ring, 11, may abut, as best shown in Fig. 2.

In order to remove the demountable rim with its tire, it is only necessary to unscrew the four nuts, 14, whereupon the holding or clamping ring, 11, and then the demountable rim may be slipped off laterally. In order to remove the tire from the demountable rim it is only necessary to unscrew the screws 9, whereupon the demountable rim comes apart. The tire is placed on the demountable rim while it is separated into its two parts and these parts are then fastened together, before inflating the tire, by means of the screws.

It will be seen that when the demountable rim has been assembled on the wheel, the latter presents a neat appearance, no fastening means except the few bolt heads and nuts being visible and, because the fastening lugs for the demountable rim are housed within the channel-shaped main rim, the thickness of the double rim in the radial direction is no greater than that of the same parts in an ordinary wheel having a demountable rim which is simply a split ring that must have its ends pried apart when the tire is to be taken off and which must be expanded in order to adjust it to the tire. Furthermore, because of the interlocking between the lugs on the demountable rim and one of the flanges of the wheel rim, the fit of the demountable rim upon the wheel may be loose enough to permit the demountable rim to be slipped on and off easily and conveniently. In other words, the construction and proportions of parts is such that the parts may be assembled and disassembled with the exertion of only a small amount of effort required to operate an automatic screw driver, no prying or pounding being necessary.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. The combination with a wheel having a channel-shaped rim with the flanges directed outwardly, one of the flanges being shallower than the other and being provided with a series of notches distributed along the same and extending inwardly from the periphery thereof, the deeper flange having a seat for supporting one side of a rim, a demountable rim having an internal diameter approximately as great as the greatest diameter of said shallower flange, said demountable rim having lugs on the inner side, said lugs being constructed and arranged to pass through said notches when the demountable rim is slipped laterally upon the wheel rim and being so disposed that parts thereof rest within said notches when the demountable rim is in engagement with the seat on the deeper flange of the wheel rim, and means detachably associated with said shallower flange for engaging with the side of the demountable rim and holding it against lateral displacement.

2. The combination with a wheel having a channel-shaped rim with the flanges directed outwardly, one of the flanges being shallower than the other and being provided with a series of notches distributed along the same and extending inwardly from the periphery thereof, a demountable rim having an internal diameter approximately as great as the greatest diameter of said shallower flange, said demountable rim having lugs on the inner side thereof, said lugs being constructed and arranged to pass through said notches when the demountable rim is slipped laterally upon the wheel rim and being so disposed that parts thereof rest within said notches when the demountable rim is in engagement with the deeper flange of the wheel rim, a ring having an external diameter approximately as great as that of the deeper flange of the wheel rim lying against the exterior face of the said shallower flange, and bolts passing through said flanges and through said ring to hold the ring in place and clamp the demountable rim between it and the deeper flange of the wheel rim.

In testimony whereof, I sign this specification.

FREDERICK GINSBURG.